US008590549B2

(12) United States Patent
Dollinger

(10) Patent No.: US 8,590,549 B2
(45) Date of Patent: Nov. 26, 2013

(54) DEVICE FOR REMOVING DUST FROM PHARMACEUTICAL TABLES OR CAPSULES

(76) Inventor: Martial Dollinger, Braine l'Alleud (BE)

( * ) Notice: Subject to any disclaimer, the term of this patent is extended or adjusted under 35 U.S.C. 154(b) by 880 days.

(21) Appl. No.: 12/665,319

(22) PCT Filed: Dec. 3, 2007

(86) PCT No.: PCT/EP2007/010491

§ 371 (c)(1),
(2), (4) Date: Dec. 17, 2009

(87) PCT Pub. No.: WO2008/154948

PCT Pub. Date: Dec. 24, 2008

(65) Prior Publication Data

US 2010/0126538 A1 May 27, 2010

Related U.S. Application Data

(63) Continuation-in-part of application No. PCT/EP2007/005411, filed on Jun. 20, 2007.

(51) Int. Cl.
*B08B 3/00* (2006.01)
*B65G 1/00* (2006.01)
*B65G 65/00* (2006.01)

(52) U.S. Cl.
USPC ............................ 134/132; 134/133; 414/291

(58) Field of Classification Search
USPC .................................. 134/133, 132; 414/291
See application file for complete search history.

(56) References Cited

U.S. PATENT DOCUMENTS

| | | | | |
|---|---|---|---|---|
| 2,918,691 | A | 12/1959 | Lake | |
| 5,024,320 | A * | 6/1991 | Musschoot | 198/756 |
| 5,931,286 | A * | 8/1999 | Illi | 198/769 |
| 6,851,911 | B2 * | 2/2005 | Lhoest | 414/299 |
| 6,932,210 | B2 * | 8/2005 | Kramer | 198/495 |

FOREIGN PATENT DOCUMENTS

| | | | |
|---|---|---|---|
| DE | 9416619 | U1 | 1/1995 |
| EP | 0549533 | A | 6/1993 |
| EP | 1322533 | A | 9/2001 |
| GB | 1158831 | A | 7/1969 |
| WO | 02/28751 | A | 4/2002 |

OTHER PUBLICATIONS

International Search Report for Parent WIPO Application No. WO 2008/154948.

* cited by examiner

*Primary Examiner* — Joseph L Perrin
*Assistant Examiner* — Levon J Shahinian

(57) ABSTRACT

A device for removing dust from pharmaceutical tablets or capsules, comprising a dust removal column with a first ramp for controlled conveying in a helical shape; the first ramp is composed of a conveying conduit which has walls leak-light wiih respect to the tablets or capsules and which comprises an inlet in the lower part of the column and an outlet in the upper part of the column, this column comprising a chamber which aspirates dust from tablets or capsules and which has walls that are leak-tight with respect to the conveyed tablets or capsules, a passage for aspiration of dust from tablets or capsules is provided, and the whole assembly formed by the conveying conduit and the aspiration chamber is configured such that the column is leak-tight with respect to the dust from the tablets or capsules.

2 Claims, 9 Drawing Sheets

DEVICE FOR REMOVING DUST FROM PHARMACEUTICAL TABLES OR CAPSULES

CLAIM OF PRIORITY

Figure 1A:
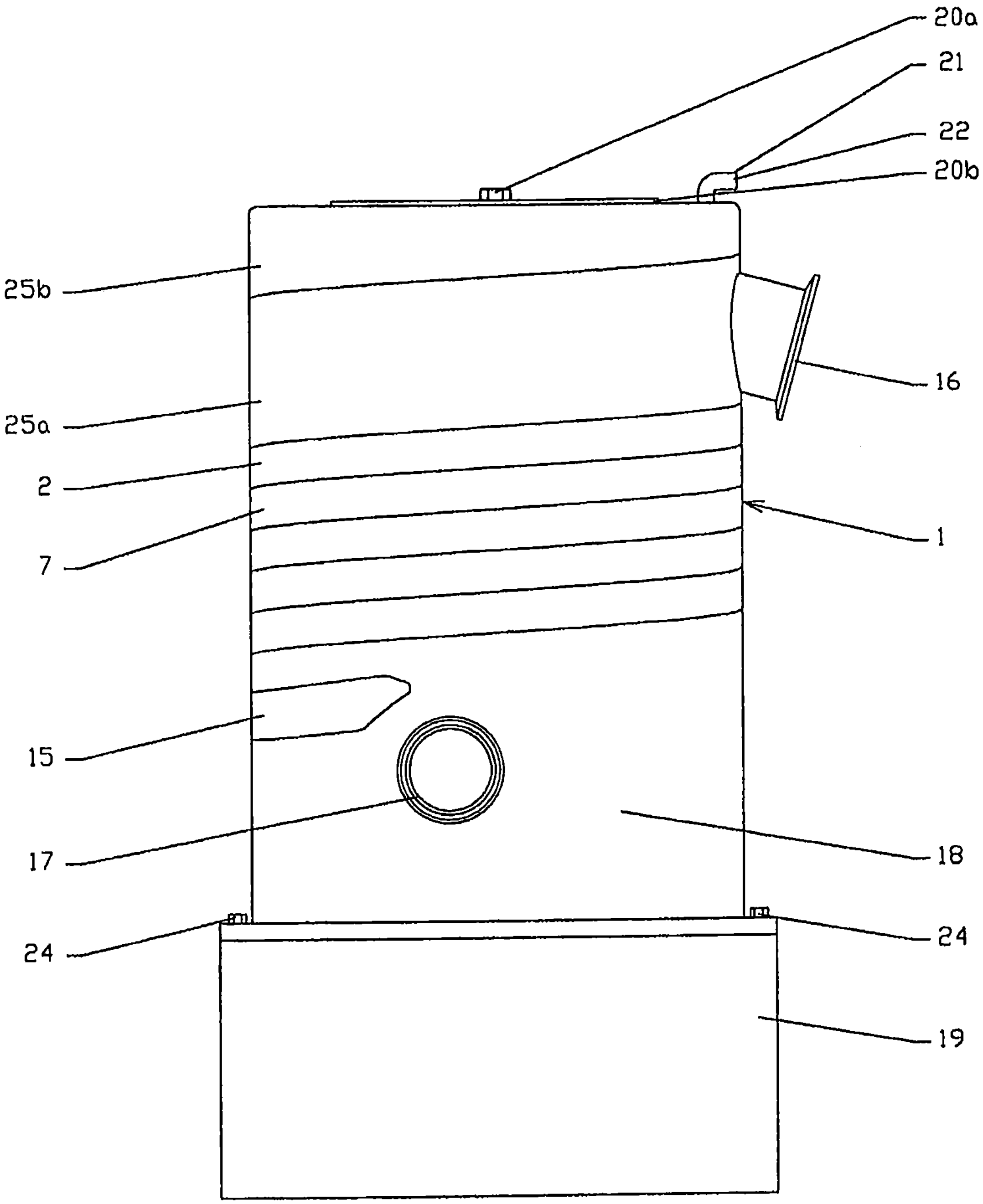

This application is a national stage application which claims priority from a PCT application WO2008/154948 titled “Device for removing dust from pharmaceutical tablets or capsules” filed Dec. 3, 2007 which is a continuation in part of a PCT application PCT/EP2007/005411 titled “Device for removing dust from pharmaceutical tablets or capsules” filed on Jun. 20, 2007.

BACKGROUND OF THE INVENTION

The present invention relates to a device for removing dust from pharmaceutical tablets or capsules. Such devices are used in the pharmaceutical industry for removing from tablets or capsules unwanted medicine powder dust that covers them after their manufacturing process, by compressing or encapsulating this powder. The device for removing dust is thus located in the production line of said tablets or capsules, between a manufacturing devices, by compressing or encapsulating medicine powder, and a conditioning device of these tablets or capsules after removal of their dust.

A prior art dust removal device comprises a dust removal column, generally made of stainless steal, comprising a pharmaceutical tablets or capsules conveying ramp having a shape of an ordered helicoid and enrolled around a central cylindrical element. The ramp comprises a base, an internal edge by which said ramp is fixed to said central element of the column, generally by continuous or point by point welding of said edge from the bottom to the top of the central element, and a peripheral edge. This edge delimitates with the central cylindrical element a conveying channel for tablets or capsules. The column comprises at its bottom an inlet for feeding tablets or capsules in the channel and at its top an outlet for discharging said tablets or capsules from said channel. This column is arranged to be mounted at its bottom, for example by means of nuts, to a motor bloc comprising a motor, for examples an oscillating electromagnetic motor, which when it is switched on, transmits an oscillating movement to the column, which leads tablets or capsules from the bottom to the top of said column, through the channel delimitated by the conveying ramp. Slits are provided at regular distances in the central cylindrical element of the column, contiguously to the base of the ramp and the central cylindrical element is depressed thanks to an aspiration means so that the powder dust that covers tablets or capsules is aspirated through said slits into the central cylindrical element and thereby is removed from the device. Alternatively, the base of the ramp is provided in its radial direction with openings having a diameter lower than that of the tablets or capsules from which dust needs to be removed, these openings being located contiguously to said slits, which themselves are arranged below said base. In this embodiment, cups are disposed below said openings, between the base of the ramp and each slit in the central cylindrical element, in order to aspirate powder dust from tablets or capsules through said openings and to guide this dust through said slits into the central cylindrical element for removing it from the device. The column is surrounded by a tubular enclosure closed at its top, generally made of stainless steal or of a plastic material, whose internal diameter is larger than the outer diameter of the dust removal column and which is removably mounted to the motor bloc of the column, for example by means of nuts or clips, in order to create a confinement space around said column, in order to avoid that tablets or capsules could escape the device and that medicine dust could then spread into the ambient atmosphere. Indeed in such a device, the conveying ramp is not leaktight with respect to the tablets or capsules, which therefore can escape this ramp during their conveyance by bouncing above the peripheral edge of said ramp, which therefore is not constitutive, is not part, of a conveying conduit whose walls would be leaktight with respect to said tablets or capsules. The tablets or capsules dust aspiration means may also be located inside the enclosure, between the latter and the column, eg at its bottom, so that aspiration is performed by depressing the inner space of said enclosure.

Such a conventional device has several disadvantages. Firstly, its construction is complicated since it requires the conveying ramp to be welded to a central cylindrical element, this being a time consuming and difficult task. It also requires a confinement enclosure to be provided to the column for insulating it from the ambient atmosphere, such an enclosure being a separate element from the column, so that such a conventional column cannot be dismounted from the motor bloc of the dust removal device without previously dismounting said enclosure, thereby exposing to the ambient atmosphere tablets or capsules and/or their dust still present in the column if the latter has not previously been cleaned.

Besides, the diameter of the central cylindrical element of such a device may be larger than a quarter of the diameter of the dust removal column, this first diameter being determined both by the aspiration efficiency required through this cylindrical element for achieving sufficient dust removal of the conveyed tablets or capsules and by the rigidity of the column to be achieved for maintaining the integrity of the device. Though, for a given diameter of the column, the diameter of the central cylindrical element determines the dust removal capacity of said column. This capacity is also determined by the height of the peripheral edge of the conveying ramp. Indeed, the thickness of the layer of tablets or capsules that can be conveyed and dust removed by the device needs to be lower than said height, otherwise tablets or capsules would protrude from the ramp and then rest at the bottom of the column without being dust removed.

During the convey of tablets or capsules along the ramp of the column and despite the aspiration of the powder dust which covers them through the slits of the central cylindrical element of said column, dust settles at the column surface and at the internal face of its enclosure. After a certain period of time, the accumulation of this dust becomes excessive and it is then essential to remove it from the surfaces it covers, by cleaning the latter. This is essential as well when tablets or capsules having a different composition than those previously conveyed by the device have to be introduced therein for dust removal, in order to avoid any contamination of the new tablets or capsules by powder dust having a different composition. Such a cleaning can be handmade, by dismounting the enclosure of the device and cleaning its internal surface as well as the column, for example by means of a soft textile, filled with an appropriate detergent if suitable. This cleaning technique is time consuming, namely because it requires the enclosure of the device to be dismounted and it is furthermore burdensome and sometimes insufficient. It may be possible to replace in the device the column and the enclosure to be cleaned by a clean column and a clean enclosure, when one wishes to switch from dust removal of tablets or capsules of a given composition to tablets or capsules of another composition, in order not to interrupt the manufacturing/dust removal/conditioning line during the whole cleaning operation of such a column and enclosure. However, dismounting the enclosure of the device for dismounting the column, and dismounting the latter, inevitably liberates powder dust in the ambient atmosphere as well as on the motor bloc of the device, which causes a risk of contamination by this dust of tablets or capsules of another composition having to be conveyed in the clean column and enclosure replacing those which need to be cleaned.

In an attempt to overcome these disadvantages related to manually cleaning such a dust removal device, it has been suggested by prior art references to provide said device with a self cleaning system. For example, according to EP patent n° 1322533 B1, the disclosed device is provided with sprinklers that spread pressurized water with detergent within the confinement space of the column defined by the enclosure of the device, either from inside its central cylindrical element through openings suitably provided therein, or from outside its enclosure through such openings provided therein. The device is then further provided with a collecting element arranged for removing water from said device. For drying the inside of the device after its cleaning, the referred patent also discloses to connect a source of hot pressurized air or a vacuum pump to the device.

Even though such a self-cleaning device is a breakthrough compared to manually cleanable conventional devices for removing dust from pharmaceutical tablets or capsules, it does not avoid other disadvantages of such devices than those related to their difficult cleaning and even as far as cleaning is concerned, it does not provide an optimal solution to the problem of cleaning such devices.

Indeed, the cleaning system according to said patent is relatively complicated since it requires that a network of sprinklers is distributed within or around the column of the dust removal device. Besides, the quality of the achieved cleaning is not optimal since the cleaning efficiency of water jets spread by the sprinklers depends on the location of the parts of the device that are raised by these jets relatively to their spreading location. In particular, a groove is generally present between the internal edge of the conveying ramp and the central cylindrical element of the column, to which element said edge is fixed, and powder dust tends to agglomerate in this groove, which is especially hard to perfectly clean with water jets spread by said sprinklers. Actually, achieving a perfect cleaning of the column requires to dismount the enclosure and to finish the cleaning manually. Therefore, the disadvantage of such a manual cleaning is not entirely avoided by the disclosed self-cleaning device.

SUMMARY OF THE INVENTION

The disadvantages of prior art devices for removing dust from pharmaceutical tablets or capsules are overcome by the device according to the present invention, which comprises a dust removal column which comprises at least one ramp, each ramp having a shape of an ordered helicoid, a first ramp being a conveying ramp comprising a first base having a rear face and an front face, a first peripheral edge and a first internal edge, said first ramp contributing to delimitate a conveying conduit having walls leaktight with respect to tablets or capsules and comprising an inlet in the lower part of said column and an outlet in the upper part of said column, said column comprising an aspiration chamber for aspiration of dust from tablets or capsules and having walls that are leaktight with respect to tablets or capsules, of which walls a first wall is composed of one of said first peripheral edge or of said first internal edge or of said first base of said conveying ramp, a passage for aspiration of dust from tablets or capsules being provided in said first wall between said conveying conduit and said aspiration chamber, the whole assembly formed by said conveying conduit and said aspiration chamber being configured such that said column is leaktight with respect to dust from tables or capsules. The column is composed of sections, each section of the column comprising a section of each ramp having an axial height which is substantially equal to the translation height of the helicoids, each section of a ramp being arranged to fit to an underlying section of a ramp.

Thanks to the fact that the dust removal device according to the invention comprises a conveying conduit and an aspiration chamber whose walls are leaktight with respect to tablets or capsules and that the whole assembly formed by said conveying conduit and said aspiration chamber is configured such that said column is leaktight with respect to dust from tablets or capsules, no tablet or capsule can protrude from the conveying conduit, this substantially increasing the conveying capacity of the latter, and no dust can diffuse outside the column, contrary with prior art devices. In addition, the construction of the device according to the invention is much simpler than that of prior art devices since it does not require to surround the dust removal column with a separated confinement enclosure, this confinement being achieved thanks to the arrangement of the conveying conduit and of the aspiration chamber themselves. Furthermore, the conveying ramp does not need to be fixed, generally through welding, to a central cylindrical element, since a central cylindrical volume is delimitated in the device according to the invention by the internal edge of each ramp. Moreover, since said central cylindrical element is not mandatory used for the aspiration of powder dust from the conveyed tablets or capsules as in a prior art device, the diameter of said element does not need to be dictated by the aspiration efficiency required for reaching a sufficient dust removal of the conveyed tablets or capsules and said diameter can therefore be substantially reduced compared to that of a central cylindrical element according to the prior art, such a reduction enabling to proportionally increase the tablets or capsules loading capacity of the device according to the invention.

DETAILED DESCRIPTION OF THE INVENTION

Figure 1B:
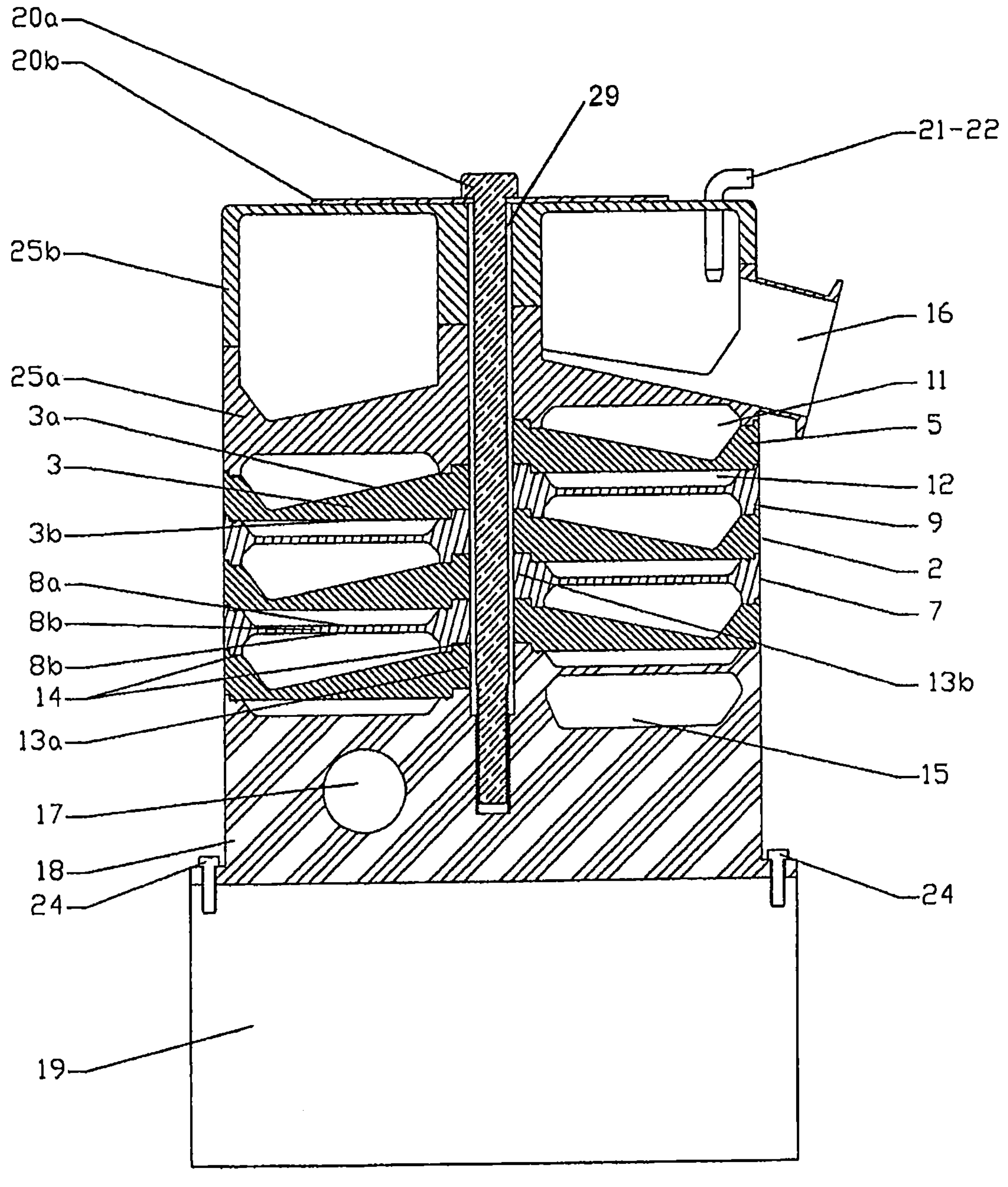

A first and a second embodiment of the invention, non limitative of its scope, will now be further described, with reference to the following drawings, in which:

FIG. 1*a* is a schematic view of said first embodiment of a device according to the invention;

FIG. 1*b* is a longitudinal section view of the device illustrated by FIG. 1*a;*

Figure 2:
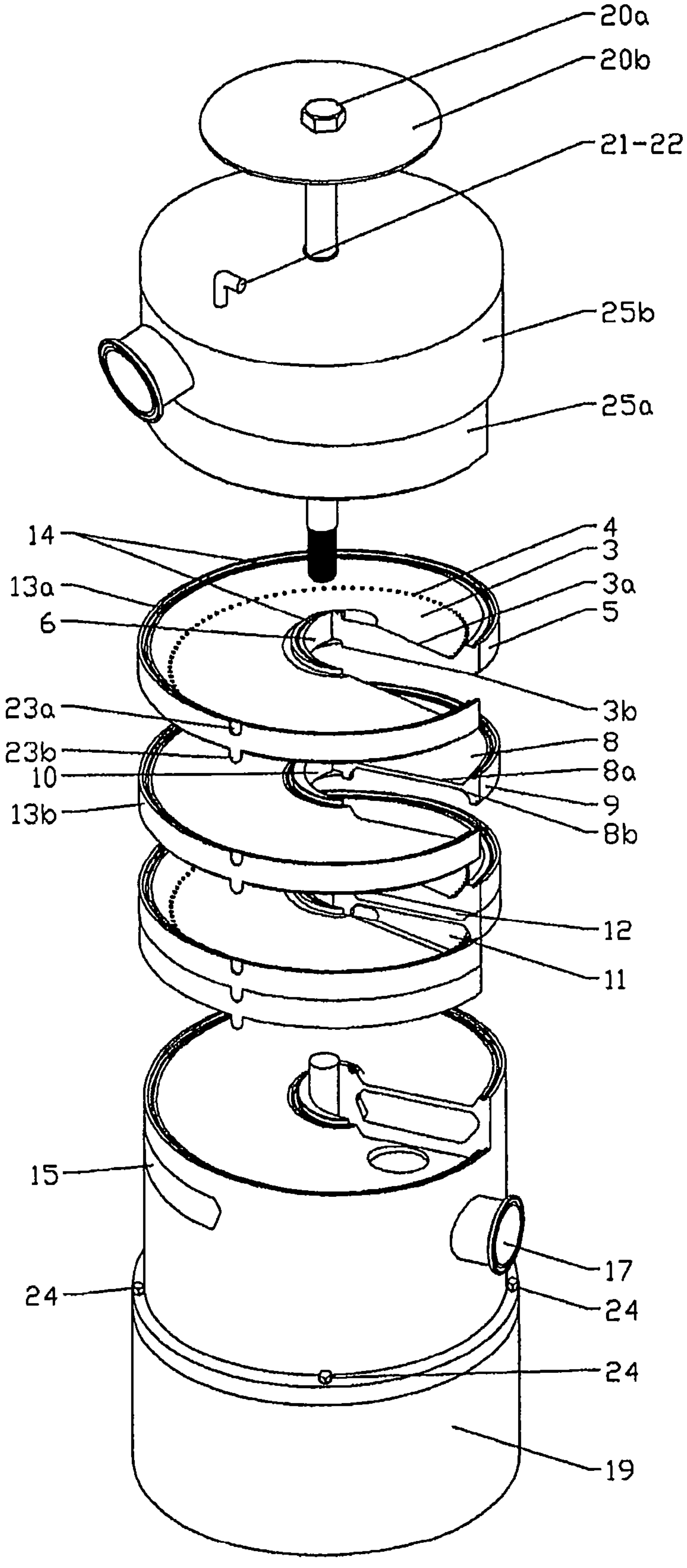
Figure 3A:
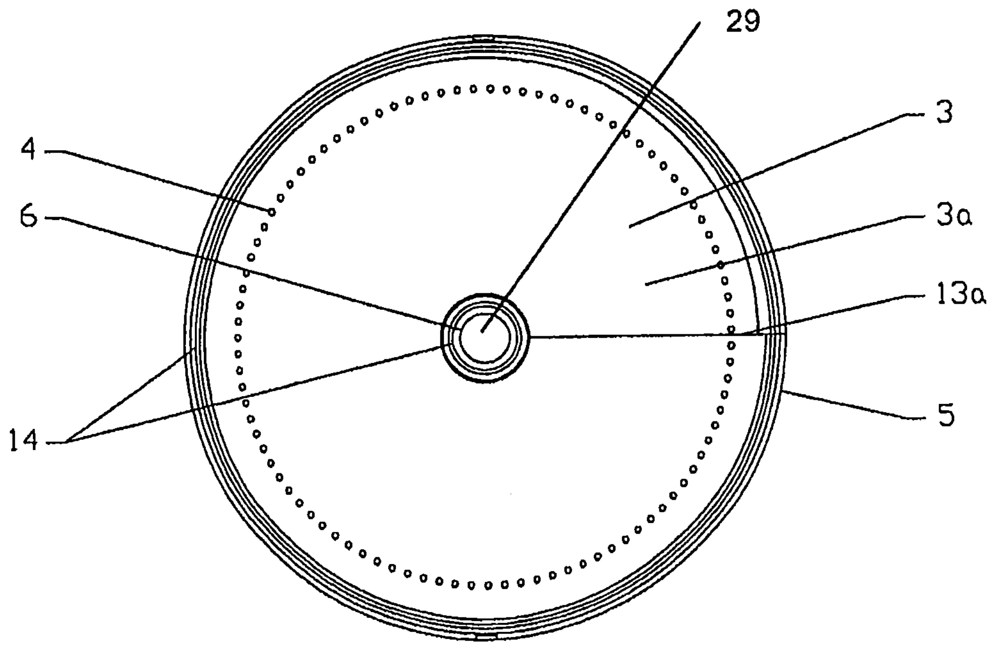
Figure 3B:
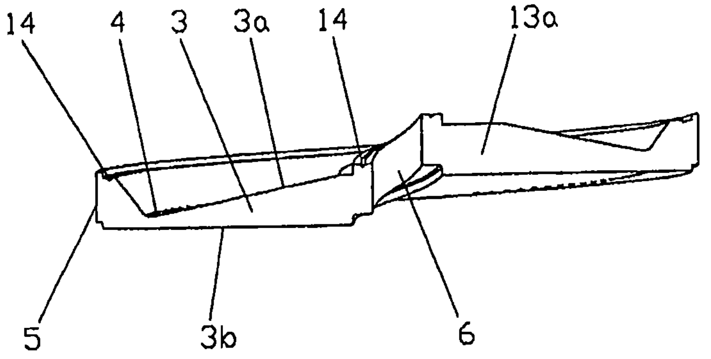

FIG. 2 is perspective view of the device illustrated by FIG. 1*a* shown opened for illustrating the alternatively superposed sections of a conveying ramp and of an aspiration ramp;

FIG. 3*a* is a view from above of a section of the conveying ramp illustrated by FIG. 2;

FIG. 3*b* is a longitudinal section view of the section illustrated by FIG. 3*a;*

Figure 4A:
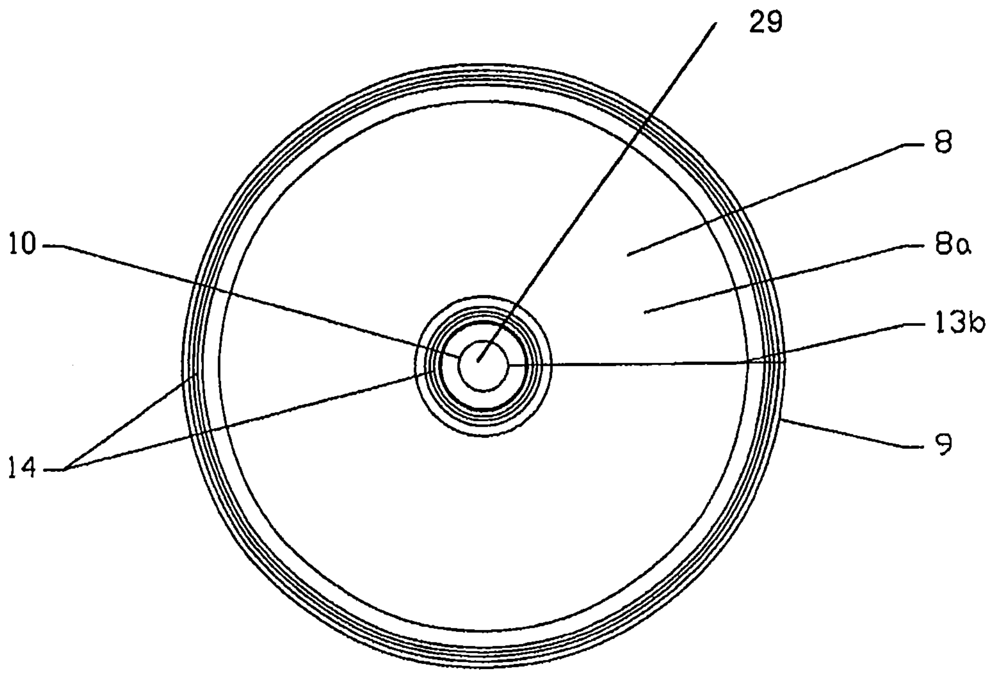
Figure 4B:
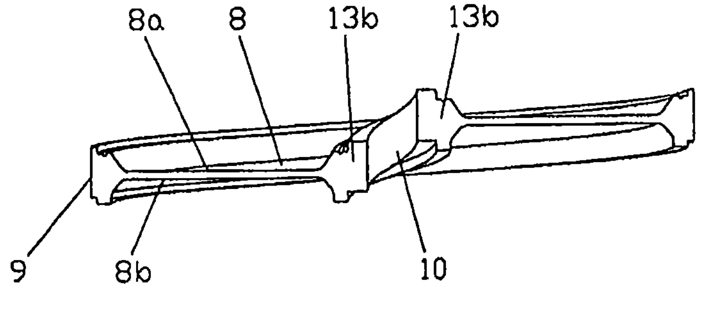

FIG. 4*a* is a view from above of a section of the aspiration ramp illustrated by FIG. 2;

FIG. 4*b* is longitudinal section view of the section illustrated by FIG. 4*a;*

Figure 5A:
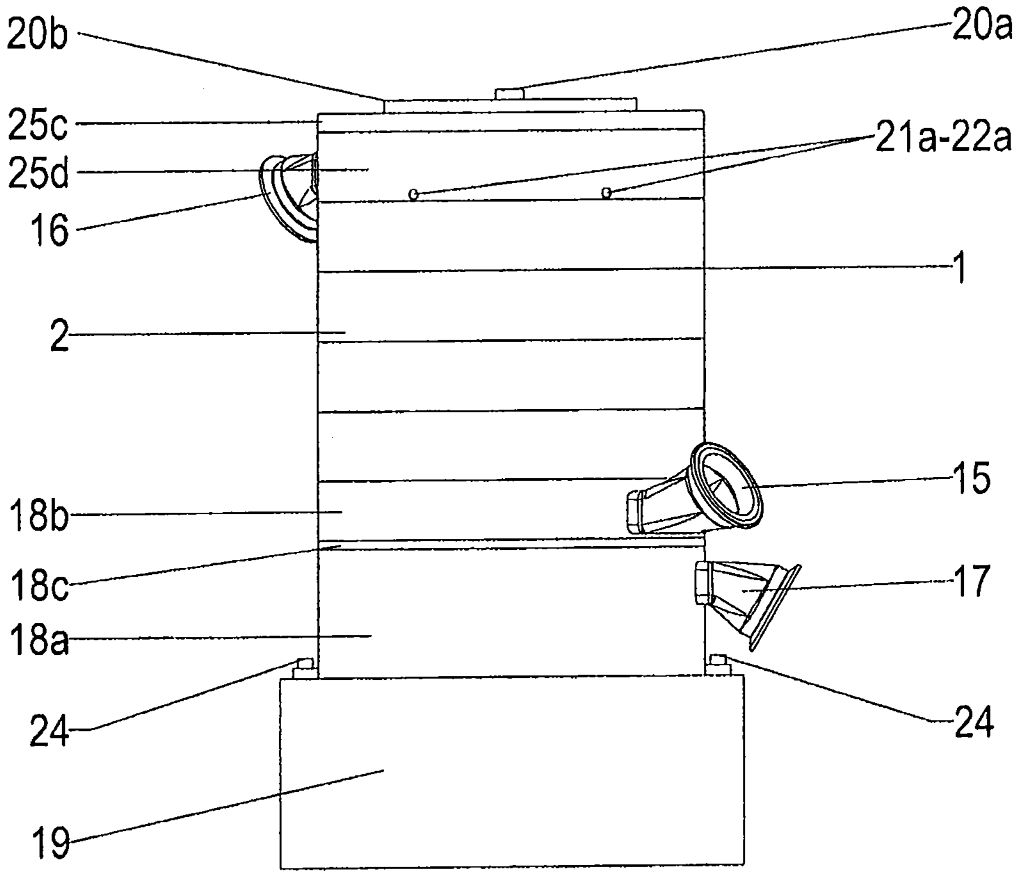
Figure 5B:
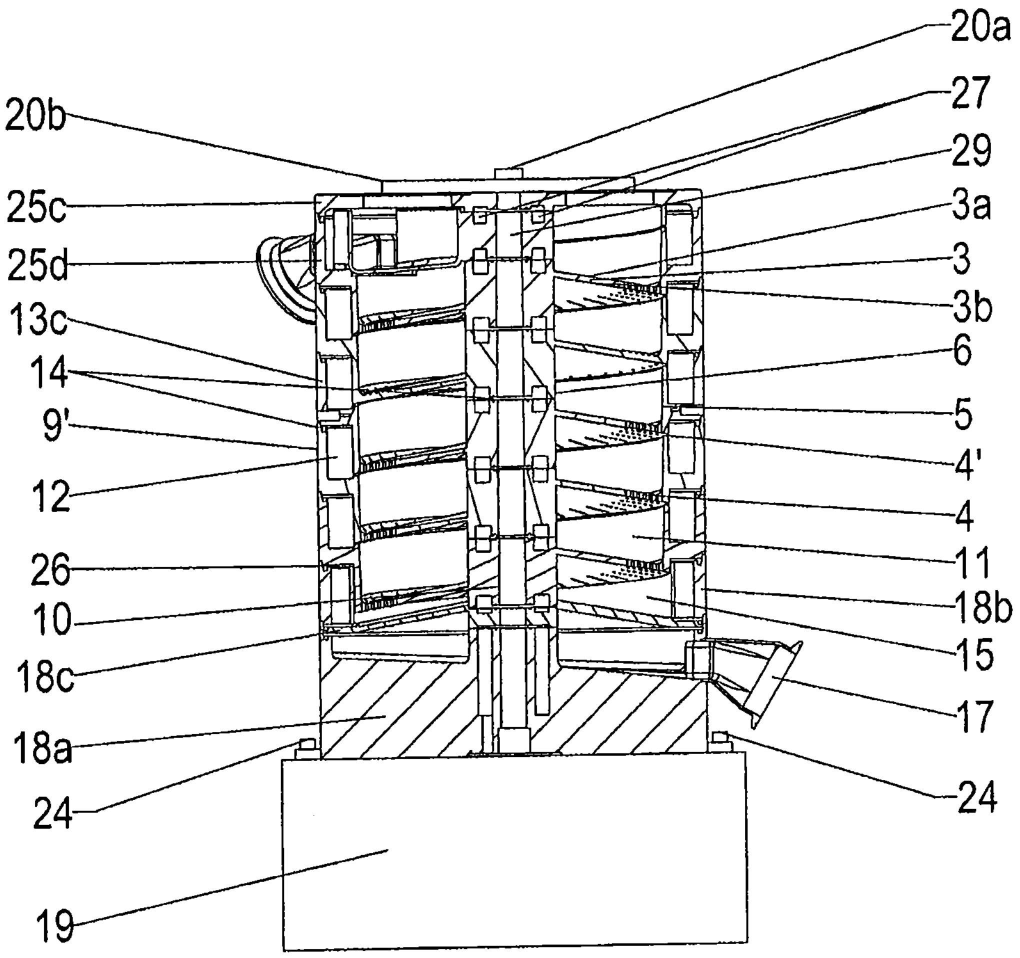

FIG. 5*a* is a schematic view of said second embodiment of the invention;

FIG. 5*b* is a longitudinal section view of the device illustrated by FIG. 5*a;*

Figure 6:
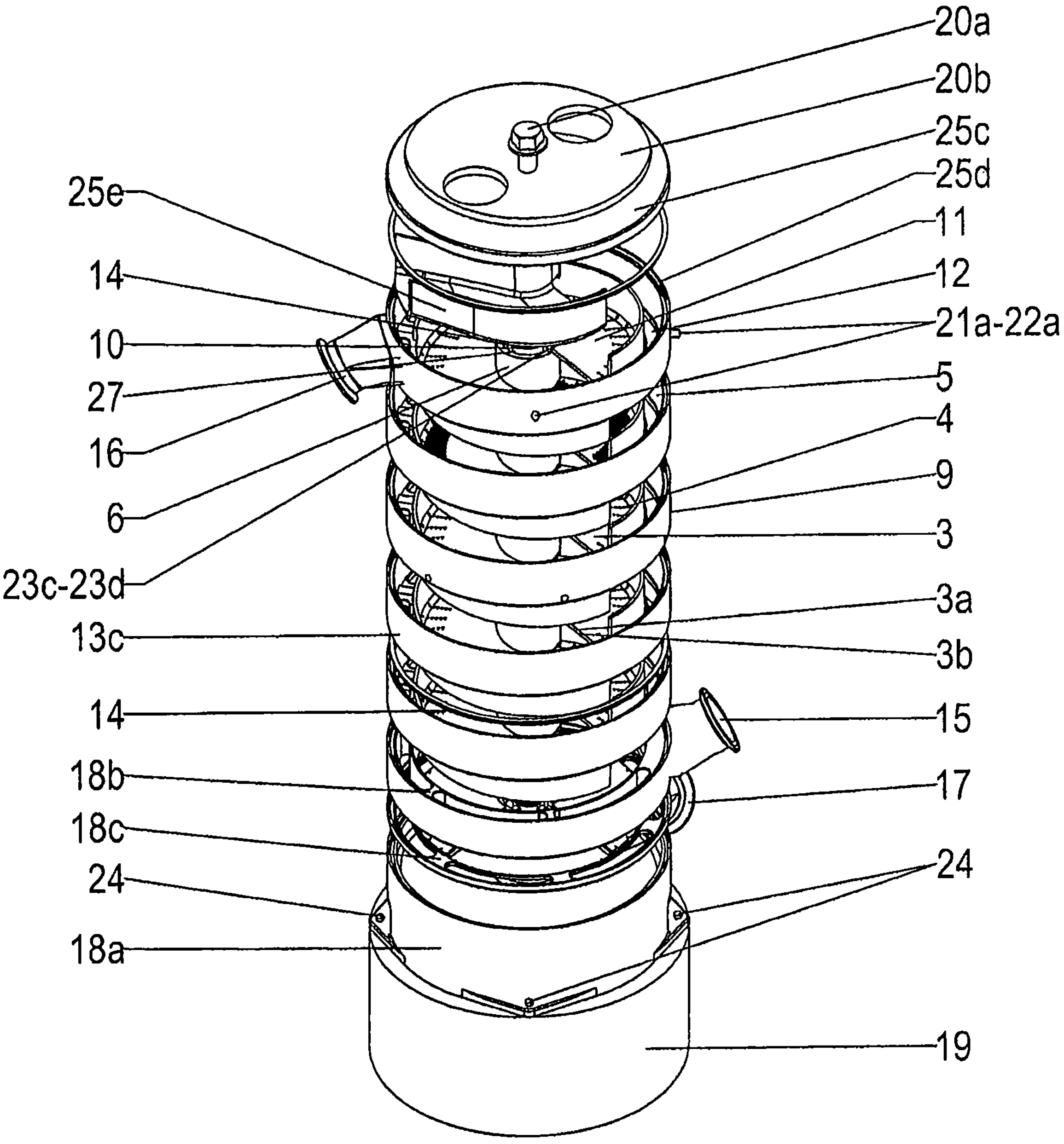
Figure 7A:
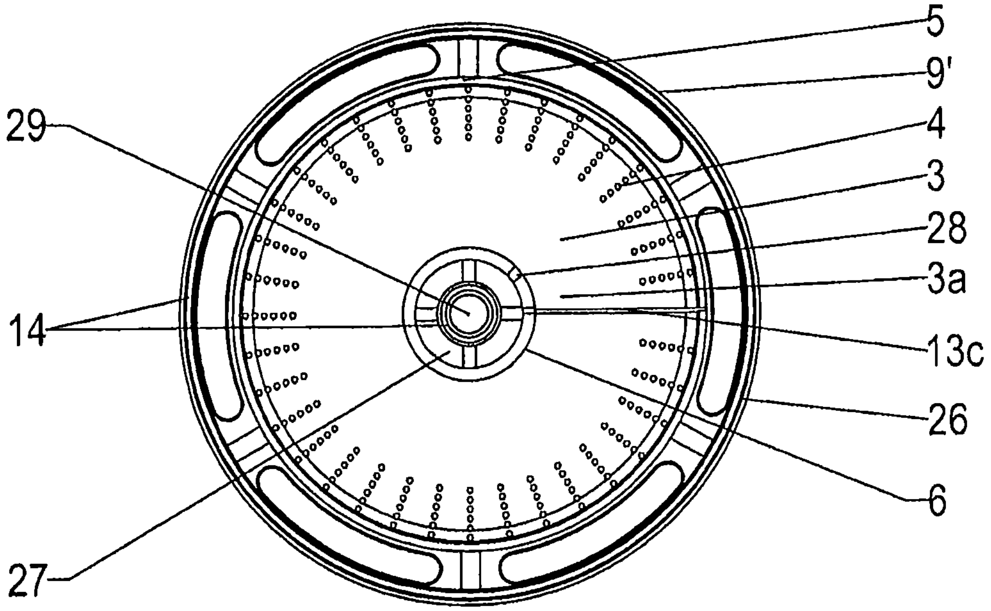
Figure 7B:
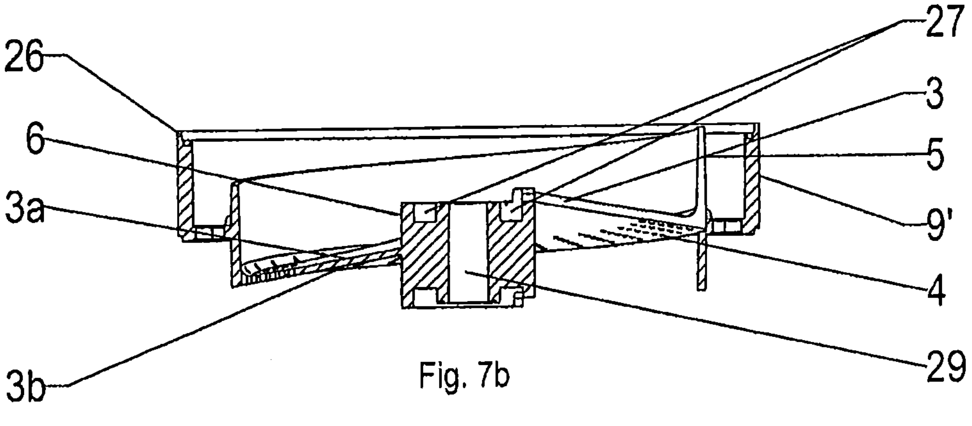

FIG. 6 is a perspective view of the device illustrated by FIG. 5*a* shown opened for illustrating the superposed sections of the column;

FIG. 7*a* is a view from above of a section of the column illustrated by FIG. 6;

FIG. 7*b* is a longitudinal section view of the section of the column illustrated by FIG. 7*a*.

In each of the two illustrated embodiments of the invention, the device for removing dust from tablets or capsules comprises a dust removal column 1 comprising a first conveying ramp 2 having a shape of an ordered helicoid and comprising a first base 3 having a rear face 3*a* and an front face 3*b*, said base being provided with aspiration openings 4, a first peripheral edge 5 and a first internal edge 6. The base of the conveying ramp may have a "V" profile as shown in FIG. 1*b* and FIG. 2 or a "W" profile or any other suitable profile for achieving an optimized conveying and dust removal from tablets or capsules in the device. The shape, number and location of said openings may also be chosen in order to optimize the aspiration efficiency. These openings may for example have a circular shape and be provided in the "V" profile base of the conveying ramp as shown by FIGS. 1*b*, 2, 3*a* and 3*b* as well as by FIGS. 5*b*, 6, 7*a* and 7*b* or they may have an elongated shape and/or be distributed more homogeneously in the surface of the base of the conveying ramp. The roughness of this surface may also be chosen for achieving an optimized conveying and dust removal from tablets or capsules in the device. Said surface may for example be smooth or show a motive in relief as an embossing appearance for example.

In the first illustrated embodiment, the column comprises a second aspiration ramp 7 having a shape of an ordered helicoid, said helicoid having a diameter substantially equal to that of the helicoid of which said first conveying ramp has the shape and a distance from the line which generates said helicoid to its axis substantially equal to that of the helicoid of which said first conveying ramp has the shape, said first conveying ramp and said second aspiration ramp being coaxial, said second aspiration ramp being arranged parallelly and below said first conveying ramp so that together both ramp form a double helix, said second aspiration ramp comprising a second base 8 having a rear face 8*a* and a front face 8*b*, a second peripheral edge 9 and a second internal edge 10. The heights of the first and the second peripheral edges on a one hand and of the first and the second internal edges on the other hand are respectively complementary in order to delimitate the conveying conduit 11 of the device between the rear face of the first base of the first conveying ramp, the front face of the second base of the second aspiration ramp, and the respective internal and peripheral edges of both ramps and in order to delimitate the aspiration chamber 12 of the device between the rear face of the second base of the second aspiration ramp, the front face of the first base of the first conveying ramp and the respective internal and peripheral edges of both ramps. In this embodiment, the sole aspiration passage existing between the conveying conduit and the aspiration chamber consists in aspiration openings 4.

In the second illustrated embodiment, no second aspiration ramp is provided and the height of said first internal edge and of said first peripheral edge are substantially equal to the translation height of the ordered helicoid so that the conveying conduit is delimitated by said first internal edge, said first outer edge, said rear face of said first base of the conveying ramp and said front face of said base which underlies said rear face of said base. In this embodiment, the aspiration chamber is delimitated by said first peripheral edge and an outer peripheral edge 9' which is coaxial with said first peripheral edge and is of a height which is substantially equal to the translation height of said helicoid, said outer peripheral edge being arranged on the opposite side of said first peripheral edge relatively to said first internal edge and being connected to said first peripheral edge by connecting means 26. In this embodiment, the aspiration passage between the conveying conduit and the aspiration chamber does not only comprise openings 4 provided in the base of the conveying ramp but also a slit 4' arranged above said first peripheral edge. In addition or alternatively to said slit, openings (not shown) may also be provided in the first peripheral edge. It should be noted that in this second embodiment of the device according to the invention, the openings provided in the base of the conveying ramp are optional.

In both the illustrated embodiments of the device according to the invention, the conveying conduit comprises an inlet in the lower part of the column and an outlet in the upper part of the column and preferably said column is made of a synthetic material, such as plastic or resin, instead of stainless steel as according to the prior art. The use of a synthetic material affords several advantages. Firstly, such a synthetic material is easier to mould or to machine than steel for manufacturing a piece, especially stainless steel. Synthetic materials are also generally lighter than steel and generate less noise during the operation of the device.

In both said illustrated embodiments, each ramp has the shape of a normal helicoid and the device further comprises a tablets or capsules feeding means 15 for feeding tablets or capsules to said first conveying conduit, said feeding means being arranged at said inlet of said conveying conduit, a discharging means 16 for discharging tablets or capsules from said conveying conduit, said discharging means being arranged at said outlet of said conveying conduit, a dust aspiration conduit 17 connected to said aspiration chamber and a motor bloc 19 arranged for transmitting an oscillating movement to said column in order to convey tablets or capsules from said inlet to said outlet of said conveying conduit.

In both the illustrated embodiments, the column further comprises a cap, generally composed of several complementary elements 25*a*, 25*b* (FIGS. 1*a*, 1*b* and 2) or 25*c*, 25*d*, 25*e* (FIGS. 5*a*, 5*b* and 6) for machining reasons. The cap is arranged to be leaktightly fit onto an assembly comprised of the conveying conduit and the aspiration chamber. The column still further comprises either a monolithic basement 18 (FIGS. 1*a*, 1*b* and 2) or a multi-parts basement 18*a*, 18*b*, 18*c* (FIGS. 5*a*, 5*b*, 6) said basement being arranged to be leaktightly fit under said assembly, and a first removable fixing means 20 for fixing said cap to said basement and arranged for compressing said assembly between said cap and said basement. The device also comprises a second removable fixing means 24, for example screws 24, for fixing the column to the motor bloc. The column cap comprises the tablets or capsules discharging means of the column and the basement comprises the tablets or capsules feeding means of the column and the aspiration conduit. The first fixing means comprise a screw 20*a* having a head and a body and arranged for substantially axially traversing the cap, which is arranged for that purpose, as well as a cylindrical central element 29 of the column, the radius of this element being equal to the distance between the line generating the helicoid of which each ramp has the shape and the axis of said helicoid, so that the head of said screw enters into contact with the top of said cap and the body of said screw is screwed in said basement of said column. The first fixing means optionally comprises a ring 20*b* arranged between the screw head and the top of the cap. The screw may alternatively be replaced by a threat shaft with a nut screwed on it in place of the screw head.

Alternatively, according to a further non illustrated embodiment of the invention, each ramp has a shape of a closed helicoid so that there is no central cylindrical element through which a fixing screw can pass. In this situation, the column cap is not arranged to be traversed by a screw and can be fixed to the basement of said column for example by means of two parallel shafts mounted in said basement and located symmetrically to the column, and on which a longitudinal plate can be slipped through openings arranged for that purpose at its extremities this plate overlapping the column cap and being pressed on it thanks to nuts screwed above said plate, on a thread top of each shaft.

Whatever are the used fixing means, the column may easily be dismounted from the motor bloc and replaced by another column while the first column is cleaned, in order to limit the interruption of the device operation to the period of time required for replacing said column, which therefore constitutes an interchangeable dust removal module.

In both the illustrated embodiments, the device further comprises a feeding means 21 (FIGS. 1*a*, 1*b* and 2), or 21*a* (FIGS. 5*a* and 6) for feeding a cleaning fluid for cleaning at least one of the conveying conduit and the aspiration chamber and connecting means 22 (FIGS. 1*a*, 1*b* and 2) or 22*a* (FIGS. 5*a* and 6) for connecting said device to a drying device for drying the conveying conduit and the aspiration chamber by blowing air into at least one of said conveying conduit and said aspiration chamber. The feeding means for the cleaning fluid and the connecting means to a drying device may be a same means as in both the illustrated embodiments, or separated means. The cleaning fluid may be removed from the column thanks to a dedicated means or as in the illustrated embodiments of the invention, thanks to the aspiration conduit. Spreading a cleaning fluid, generally water to which detergent may possibly be added, in the column by the conveying conduit or the aspiration chamber, renders the cleaning system of the invention very easy to implement since it requires no sprinklers as according to the prior art devices but uses a conduit or a chamber that is yet provided for another purpose, ie respectively, conveying tablets or capsules or aspirating dust from said tablets or capsules, for spreading said fluid in the column. Since the cleaning fluid passes through the conveying conduit and the aspiration chamber and is contained therein, a perfect cleaning of all the parts of the column which are contacted by the tablets or capsules can easily be achieved, this being not possible with a self cleaning device according to the prior art. This also enables the use of less cleaning fluid than with prior art devices. The same advantages apply to the drying of the device after its cleaning since said drying is performed in the same way that said cleaning. Optionally, the drying system of the column may comprise a source of compressed air and may consequently also be used for removing all tablets or capsules that the column might still contain, by blowing compressed air in the conveying conduit, before cleaning the column in situ or dismounting it from the motor bloc for its cleaning outside the device.

Assembling the cap of the column to its basement by compression between said cap and said basement of the whole assembly formed by the conveying conduit and the aspiration chamber affords an excellent leaktightness to the column with respect to dust from the conveyed tablets or capsules as well as to the cleaning fluid used for cleaning said column. The column may additionally be completely insulated from the ambient atmosphere by closing with tight means (not shown) the means for feeding and for discharging tablets or capsules in the device as well as the aspiration conduit, the means for feeding cleaning fluid in the device and the connecting means of the latter to a drying device. The column may then be dismounted from the motor bloc without any risk that dust from tablets or capsules could be dispersed in the ambient atmosphere.

In the second illustrated embodiment, the device comprises a central cylindrical conduit 27 for blowing air into said column, said central conduit being arranged coaxially with said column and being delimitated by a central cylindrical element 29 of said column and the internal edge of each ramp of the column and an air blowing passage 28 which is leaktight with respect to tablets or capsules is arranged between said central conduit and the conveying conduit of the column. It is thereby possible to blow air from the centre of the column to its periphery, in order to help the dust from conveyed tablets or capsule to be removed from the column through the aspiration chamber. In this embodiment, the central conduit is also used as means for feeding cleaning fluid in the conveying conduit and the aspiration chamber and as connecting means of said conduit and chamber to an external drying device.

In the first illustrated embodiment of the invention, the first conveying ramp and the second aspiration ramp are composed of sections 13*a* (FIGS. 3*a* and 3*b*), 13*b* (FIGS. 4*a*, 4*b*) respectively. Each section has an axial height substantially equal to the translation height of the helicoid of which the ramp this section is part of has the shape, each section of the first conveying ramp being arranged to fit to a section of the second aspiration ramp and conversely. Two successive sections of each ramp are positioned for a perfect fit thanks to positioning elements 23*a*, 23*b* with which each section is provided and which cooperate with each other. A sealing means 14 is provided between two successive sections and is located between their respective peripheral and internal edges. Such a sealing means may consist in resilient material rings as of the O-ring type. The sealing means may also be inherent to the material of which the sections of the ramps are made if it affords appropriate mechanical properties for achieving the required leaktightness, as for example a material which is sufficiently resilient in itself. Optionally, the base of each section of the conveying ramp has a profile designed for creating a step of a few millimeters size at the junction of two successive sections of said ramp. Such a design of the ramp profile prevents backwards movements of the tablets or capsules conveyed in the column of the device, this being especially suitable when those tablets or capsules are small and therefore tends to be subjected to such backwards movements in the direction opposite to the conveying direction.

In the second illustrated embodiment of the invention also, the column is composed of sections 13*c*, each section having an axial height which is substantially equal to the translation height of said helicoid of which the first conveying ramp has the shape, each section being arranged to fit to an underlying section. Two successive sections of the ramp are positioned for a perfect fit thanks to positioning elements 23*c*, 23*d* with which each section is provided and which cooperate with each other. A sealing means 14 is provided between two successive sections and is located between their respective peripheral outer edges. Such a sealing means may consist in resilient material rings as of the O-ring type.

Designing the column in a plurality of sections affords multiple advantages. Firstly, it allows an easy manufacturing of said column since each sections may be machinated separately. Moreover, the modularity achieved by a column designed in stackable sections enables to accommodate the height of the column to those of the manufacturing and of the conditioning devices of the tablets or capsules, between which the dust removal device is to be installed. Besides, if appropriate, the column can easily be disassembled into its sections, which may then easily be cleaned by means of a conventional dishwasher. In this embodiment, the sections of the column may be removably attached to each other, for example thanks to clips (not shown), in order for the column as a whole to be dismounted from its motor bloc, in view of its replacement by a clean column while the first column is cleaned, so that this column keeps being an interchangeable dust removal module as described above.

Finally, it should be noted that in the second illustrated embodiment of the invention, the cap of the column is actually comprised of a top 25*c* and a superior section 25*d* of said column, which is located behind said top and at which is provided the means for discharging the tablets or capsules from the column. A connecting ramp 25*e* is then provided for connecting the part of the conveying ramp comprised in said superior section to said discharging means. In this embodiment, the basement of the column is comprised of a base 18*a* and an element similar to a lower section of the column but divided into a rotating annulus 18*b* which comprises a section of the aspiration chamber, pivotably arranged on a portion 18*c* of the base of the conveying ramp. In this configuration, the means for feeding tablets or capsules to the conveying ramp is arranged at said rotating annulus, thereby enabling to freely locate this feeding means anywhere at the periphery of the column.

The invention is not limited to the illustrated and above described embodiments and extends to any embodiment covered by the following claims that the person skilled in the art can realize. For example, three variations of the second illustrated and described embodiment may be envisaged. In the first variation, the aspiration chamber which is peripheral to the conveying conduit is replaced by an aspiration chamber consisting in a cylindrical conduit in the centre of the column, similar to the central air injection conduit according to the second illustrated embodiment of the invention. In this configuration, an aspiration passage between said cylindrical conduit and the conveying conduit is provided in the first internal edge of the conveying ramp, the first peripheral edge of this ramp forming then a wall of the conveying conduit, which is leaktight with respect to tablets or capsules as well as to dust from said tablets or capsules. In the second variation, the aspiration chamber which is peripheral to the conveying conduit is replaced by a lower aspiration chamber located below the bottom of the conveying ramp and the dust from tablets or capsules is aspirated from this lower chamber of the column, through openings provided in the base of the conveying ramp. In the third variation, the aspiration chamber is delimitated by the first peripheral edge of the conveying ramp and a monolithic cylinder arranged coaxially to said ramp and having a diameter which is larger than the diameter of said first peripheral edge, said monolithic cylinder being locked with the conveying ramp by the cap and the basement of the column.

The invention claimed is:

1. Device for removing dust from pharmaceutical tablets or capsules comprising:

a dust removal column which comprises at least one ramp, having a shape of an ordered helicoid;

a first ramp being a conveying ramp comprising a first base having a rear face and a front face, a first peripheral edge and a first internal edge, said first ramp contributing to delimitate a conveying conduit having walls leaktight with respect to tablets or capsules and comprising an inlet in the lower part of said column and an outlet in the upper part of said column, said column comprising an aspiration chamber for aspiration of dust from tablets or capsules and having walls that are leaktight with respect to tablets or capsules, of which walls a first wall is composed of one of said first peripheral edge or of said first internal edge or of said first base of said conveying ramp;

a passage for aspiration of dust from tablets or capsules being provided in said first wall between said conveying conduit and said aspiration chamber;

wherein the whole assembly is formed by said conveying conduit and said aspiration chamber being configured such that said column is leaktight with respect to dust from tablets or capsules;

wherein said column is composed of sections, each section of the column comprising a section of each ramp having an axial height which is substantially equal to the translation height of said helicoids, each section of a ramp being arranged to fit to an underlying section of a ramp, said column further comprises a second aspiration ramp having substantially equal shapes and dimensions, said first conveying ramp and said second aspiration ramp being coaxial, said second aspiration ramp being arranged in parallel and below said first conveying ramp so that together both ramp form a double helix, said second aspiration ramp comprising a second base having a rear face and a front face, a second peripheral edge and a second internal edge, said first conveying ramp and said second aspiration chamber delimitate said conveying conduit between said rear face of said first base of said first conveying ramp, said front face of said second base of said second aspiration ramp, and the respective internal and peripheral edges of both ramps, and delimitate said aspiration chamber between said rear face of said second base of said second aspiration ramp, said front face of said first base of said first conveying ramp and the respective internal and peripheral edges of both ramps.

2. Device according to claim 1, wherein said first conveying ramp and said second aspiration ramp are respectively composed of sections, each section having an axial height substantially equal to the translation height of the helicoid of which the respective ramp has the shape, each section of the first conveying ramp being arranged to fit to a section of the second aspiration ramp and conversely.

* * * * *